United States Patent
Liang et al.

(10) Patent No.: US 8,670,206 B1
(45) Date of Patent: Mar. 11, 2014

(54) DISK DRIVE ESTIMATING REPEATABLE RUNOUT OF REFERENCE PATTERN BASED ON REPEATABLE RUNOUT OF PHASE ERROR

(75) Inventors: Jiangang Liang, San Jose, CA (US); Siri S. Weerasooriya, Campbell, CA (US); Yilin Cai, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 143 days.

(21) Appl. No.: 13/431,691

(22) Filed: Mar. 27, 2012

(51) Int. Cl.
 *G11B 5/596* (2006.01)
(52) U.S. Cl.
 USPC .......................................... 360/77.04; 360/75
(58) Field of Classification Search
 USPC ......... 360/55, 77.06, 31, 78.04, 77.07, 77.08, 360/77.02, 75, 77.04, 51
 See application file for complete search history.

(56) References Cited

U.S. PATENT DOCUMENTS

| | | | |
|---|---|---|---|
| 4,404,605 A | 9/1983 | Sakamoto | |
| 4,764,914 A | 8/1988 | Estes et al. | |
| 5,416,759 A | 5/1995 | Chun | |
| 5,612,833 A | 3/1997 | Yarmchuk et al. | |
| 5,668,679 A | 9/1997 | Swearingen et al. | |
| 5,793,559 A | 8/1998 | Shepherd et al. | |
| 5,844,742 A | 12/1998 | Yarmchuk et al. | |
| 5,889,631 A | 3/1999 | Hobson | |
| 5,907,447 A | 5/1999 | Yarmchuk et al. | |
| 5,930,068 A | 7/1999 | Gregg et al. | |
| 6,061,200 A | 5/2000 | Shepherd et al. | |
| 6,118,739 A | 9/2000 | Kishinami et al. | |
| 6,128,153 A | 10/2000 | Hasegawa et al. | |
| 6,141,175 A | 10/2000 | Nazarian et al. | |
| 6,181,652 B1 | 1/2001 | Katou et al. | |
| 6,370,094 B1 | 4/2002 | Kishinami et al. | |
| 6,392,834 B1 | 5/2002 | Ellis | |
| 6,421,198 B1 | 7/2002 | Lamberts et al. | |
| 6,442,112 B1 | 8/2002 | Tateishi | |
| 6,476,995 B1 | 11/2002 | Liu et al. | |
| 6,496,322 B1 | 12/2002 | Hasegawa et al. | |
| 6,510,112 B1 | 1/2003 | Sakamoto et al. | |
| 6,522,493 B1 | 2/2003 | Dobbek et al. | |
| 6,563,663 B1 | 5/2003 | Bi et al. | |
| 6,606,214 B1 | 8/2003 | Liu et al. | |
| 6,608,731 B2 | 8/2003 | Szita | |
| 6,611,397 B1 | 8/2003 | Nguyen | |
| 6,624,963 B2 | 9/2003 | Szita | |
| 6,654,198 B2 | 11/2003 | Liu et al. | |
| 6,657,810 B1 | 12/2003 | Kupferman | |
| 6,667,840 B1 | 12/2003 | Cheong et al. | |
| 6,735,040 B2 | 5/2004 | Galloway et al. | |
| 6,751,042 B2 | 6/2004 | Bi et al. | |
| 6,775,091 B1 | 8/2004 | Sutardja | |
| 6,785,084 B2 | 8/2004 | Szita | |
| 6,798,606 B2 | 9/2004 | Tang et al. | |

(Continued)

*Primary Examiner* — Ali Neyzari

(57) ABSTRACT

A disk drive is disclosed comprising head actuated over a disk comprising a reference pattern. The head is positioned at a first radial location, a first phase error is measured in response to the reference pattern at the first radial location, and a first repeatable runout (RRO) of the first phase error is measured. The head is positioned at a second radial location, a second phase error is measured in response to the reference pattern at the second radial location, and a second repeatable runout (RRO) of the second phase error is measured. The first and second RROs are processed to estimate an offset $r_0$ representing a difference between an axial rotation of the disk and an axial rotation of the reference pattern.

16 Claims, 5 Drawing Sheets

(56) References Cited

U.S. PATENT DOCUMENTS

| | | |
|---|---|---|
| 6,862,155 B2 | 3/2005 | Yang et al. |
| 6,922,304 B2 | 7/2005 | Nakagawa |
| 6,937,420 B1 | 8/2005 | McNab et al. |
| 6,952,320 B1 | 10/2005 | Pollock et al. |
| 6,965,491 B1 | 11/2005 | Perlmutter et al. |
| 6,972,540 B1 | 12/2005 | Wang et al. |
| 6,972,922 B1 | 12/2005 | Subrahmanyam et al. |
| 6,975,478 B2 | 12/2005 | Fukushima et al. |
| 6,977,792 B1 | 12/2005 | Melrose et al. |
| 6,995,941 B1 | 2/2006 | Miyamura et al. |
| 6,999,266 B1 | 2/2006 | Schmidt |
| 7,002,767 B2 | 2/2006 | Annampedu et al. |
| 7,012,778 B2 | 3/2006 | Shigematsu |
| 7,027,255 B2 | 4/2006 | Schmidt |
| 7,054,096 B1 | 5/2006 | Sun et al. |
| 7,057,836 B1 | 6/2006 | Kupferman |
| 7,068,451 B1 | 6/2006 | Wang et al. |
| 7,106,542 B1 | 9/2006 | Sun et al. |
| 7,106,547 B1 | 9/2006 | Hargarten et al. |
| 7,110,209 B2 | 9/2006 | Ehrlich et al. |
| 7,119,981 B2 | 10/2006 | Hanson et al. |
| 7,123,433 B1 | 10/2006 | Melrose et al. |
| 7,167,336 B1 | 1/2007 | Ehrlich et al. |
| 7,230,786 B1 | 6/2007 | Ray et al. |
| 7,257,062 B2 | 8/2007 | Li et al. |
| 7,271,977 B1 | 9/2007 | Melrose et al. |
| 7,286,317 B1 | 10/2007 | Li et al. |
| 7,315,431 B1 | 1/2008 | Perlmutter et al. |
| 7,317,669 B2 | 1/2008 | Lee |
| 7,330,322 B2 | 2/2008 | Hanson et al. |
| 7,333,280 B1 | 2/2008 | Lifchits et al. |
| 7,333,287 B2 | 2/2008 | Hara |
| 7,333,288 B2 * | 2/2008 | Kim et al. .................. 360/77.04 |
| 7,391,584 B1 | 6/2008 | Sheh et al. |
| 7,408,735 B1 | 8/2008 | Coric |
| 7,436,742 B2 | 10/2008 | Yanagawa |
| 7,457,075 B2 | 11/2008 | Liu et al. |
| 7,460,328 B2 | 12/2008 | Chase et al. |
| 7,474,491 B2 | 1/2009 | Liikanen et al. |
| 7,477,473 B2 | 1/2009 | Patapoutian et al. |
| 7,489,469 B2 | 2/2009 | Sun et al. |
| 7,525,754 B2 | 4/2009 | Melrose et al. |
| 7,551,387 B2 | 6/2009 | Sun et al. |
| 7,561,361 B1 | 7/2009 | Rutherford |
| 7,639,447 B1 | 12/2009 | Yu et al. |
| 7,646,559 B1 * | 1/2010 | Cheung et al. .................. 360/75 |
| 7,656,604 B1 | 2/2010 | Liang et al. |
| 7,663,835 B1 | 2/2010 | Yu et al. |
| 7,715,138 B1 | 5/2010 | Kupferman |
| 7,760,455 B2 | 7/2010 | Kang et al. |
| 7,773,328 B1 * | 8/2010 | Katchmart et al. ............. 360/51 |
| 7,791,832 B1 * | 9/2010 | Cheung et al. .................. 360/75 |
| 7,796,479 B2 | 9/2010 | Kim et al. |
| 7,800,859 B2 | 9/2010 | Moriya et al. |
| 7,839,591 B1 | 11/2010 | Weerasooriya et al. |
| 7,876,523 B1 | 1/2011 | Panyavoravaj et al. |
| 7,881,005 B1 | 2/2011 | Cheung et al. |
| 7,924,519 B2 | 4/2011 | Lambert |
| 8,059,360 B1 | 11/2011 | Melkote et al. |
| 8,116,025 B1 | 2/2012 | Chan et al. |
| 8,174,941 B2 | 5/2012 | Takazawa et al. |
| 8,537,486 B2 * | 9/2013 | Liang et al. ..................... 360/55 |
| 2001/0040755 A1 | 11/2001 | Szita |
| 2002/0067567 A1 | 6/2002 | Szita |
| 2003/0218814 A9 | 11/2003 | Min et al. |
| 2005/0152246 A1 | 7/2005 | Li et al. |
| 2005/0185319 A1 | 8/2005 | Liu et al. |
| 2005/0275964 A1 | 12/2005 | Hara |
| 2007/0096678 A1 | 5/2007 | Melrose |
| 2007/0097806 A1 | 5/2007 | Beker et al. |
| 2007/0297088 A1 | 12/2007 | Sun et al. |
| 2008/0186617 A1 | 8/2008 | Hosono et al. |
| 2008/0239555 A1 | 10/2008 | Ehrlich et al. |
| 2009/0002874 A1 | 1/2009 | Melrose et al. |
| 2009/0052081 A1 | 2/2009 | Chase et al. |
| 2009/0086364 A1 | 4/2009 | Gerasimov |
| 2010/0020428 A1 | 1/2010 | Mochizuki et al. |
| 2010/0195235 A1 | 8/2010 | Vikramaditya et al. |
| 2010/0214686 A1 | 8/2010 | Higa et al. |
| 2012/0033317 A1 | 2/2012 | Szita |
| 2012/0275050 A1 * | 11/2012 | Wilson et al. ............. 360/77.04 |

* cited by examiner $$r_0 = \frac{(R_2 - R_1)}{(1/\tan\psi_2 - 1/\tan\psi_1)}$$
FIG. 5
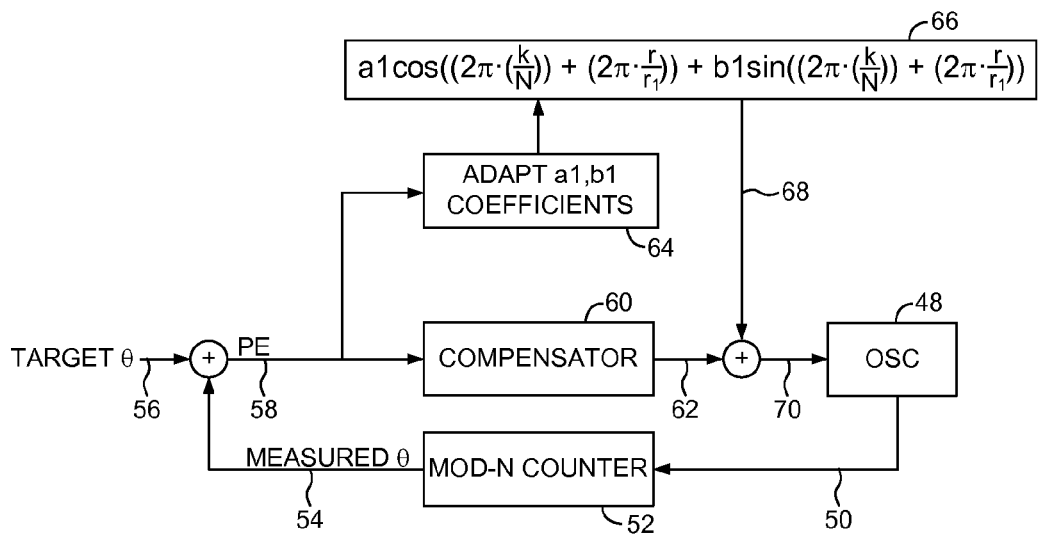
FIG. 6A
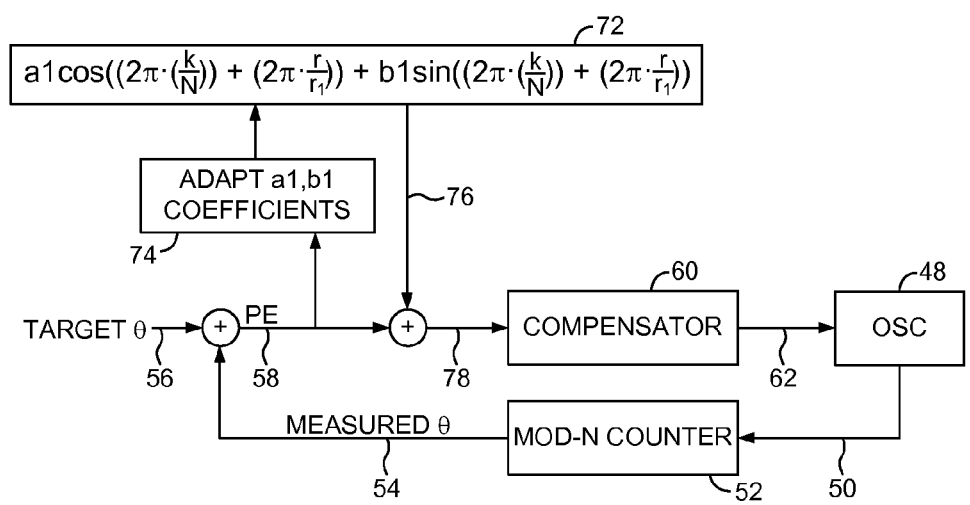
FIG. 6B

DISK DRIVE ESTIMATING REPEATABLE RUNOUT OF REFERENCE PATTERN BASED ON REPEATABLE RUNOUT OF PHASE ERROR

BACKGROUND

When manufacturing a disk drive, concentric servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

BRIEF DESCRIPTION OF THE DRAWINGS

FIG. 5 shows an equation for computing the offset $r_0$.

FIGS. 6A and 6B show a timing control loop according to an embodiment of the present invention wherein coefficients of a sinusoid are adapted to learn the RRO of the phase error.

DETAILED DESCRIPTION

Figure 2:
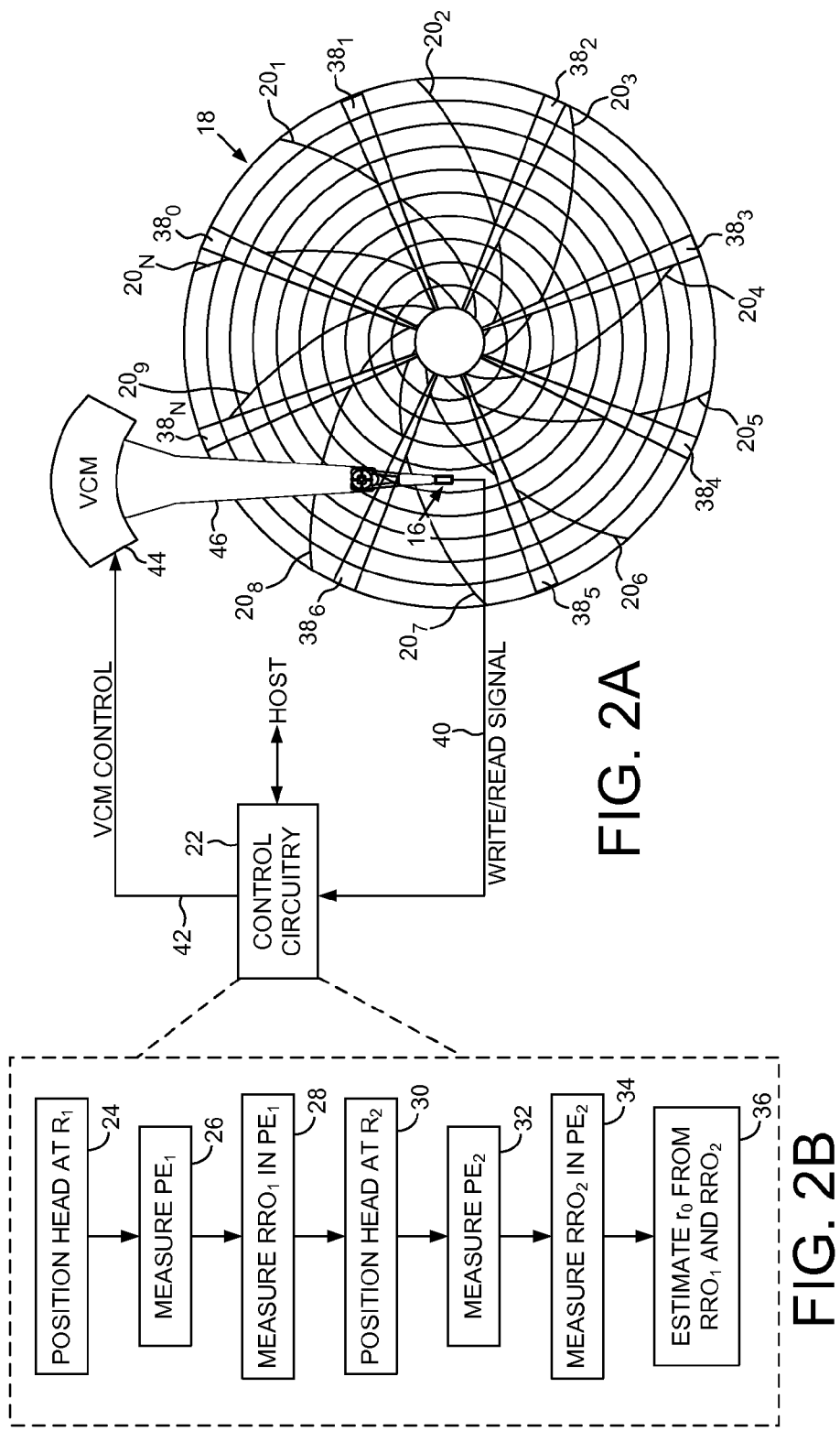
FIG. 2A shows a disk drive according to an embodiment of the present invention comprising a head actuated over a disk.
FIG. 2B is a flow diagram according to an embodiment of the present invention wherein an offset $r_0$ is measured representing a difference between an axial rotation of the disk and an axial rotation of a reference pattern recorded on the disk.

FIG. 2A shows a disk drive according to an embodiment of the present invention comprising a head 16 actuated over a disk 18 comprising a reference pattern (a plurality of spiral tracks $20_0$-$20_N$ in the embodiment shown). The disk drive further comprises control circuitry 22 operable to execute the flow diagram of FIG. 2B, wherein the head 16 is positioned at a first radial location R1 (block 24), a first phase error ($PE_1$) is measured in response to the reference pattern at the first radial location R1 (bock 26), and a first repeatable runout (RRO) of the first phase error is measured (block 28). The head is positioned at a second radial location R2 (block 30), a second phase error ($PE_2$) is measured in response to the reference pattern at the second radial location (block 32), and a second repeatable runout (RRO) of the second phase error is measured (block 34). The first and second RROs are processed to estimate an offset $r_0$ representing a difference between an axial rotation of the disk and an axial rotation of the reference pattern (block 36).

Figure 1:
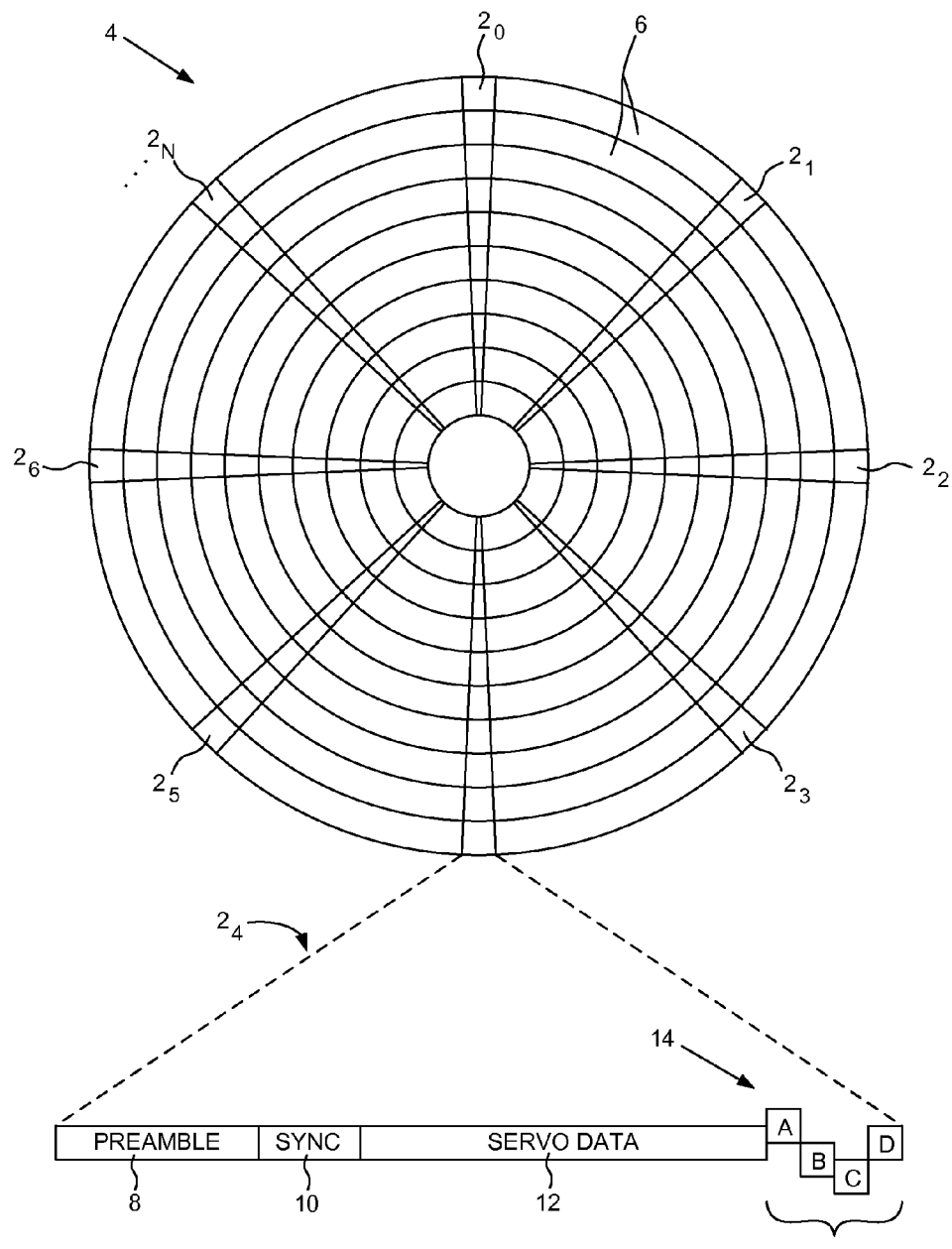
FIG. 1 shows a prior art disk format comprising a plurality of data tracks defined by embedded servo sectors.

In the embodiment of FIG. 2A, the control circuitry 22 processes a read signal 40 emanating from the head 16 to demodulate servo sectors $38_0$-$38_N$ on the disk 18 and generate a position error signal (PES) representing an error between the actual position of the head and a target position relative to a target track. The control circuitry 22 filters the PES using suitable compensation filters to generate a control signal 42 applied to a voice coil motor (VCM) 44 which rotates an actuator arm 46 about a pivot, thereby actuating the head 16 radially over the disk 18 in a direction that reduces the PES. The actual position of the head is measured by reading position information derived from the servo sectors $38_0$-$38_N$, such as a track address for coarse positioning and servo bursts for fine positioning. The servo bursts may comprise any suitable pattern, such as an amplitude based servo pattern as shown in FIG. 1, or a suitable phase based servo pattern.

Figure 3:
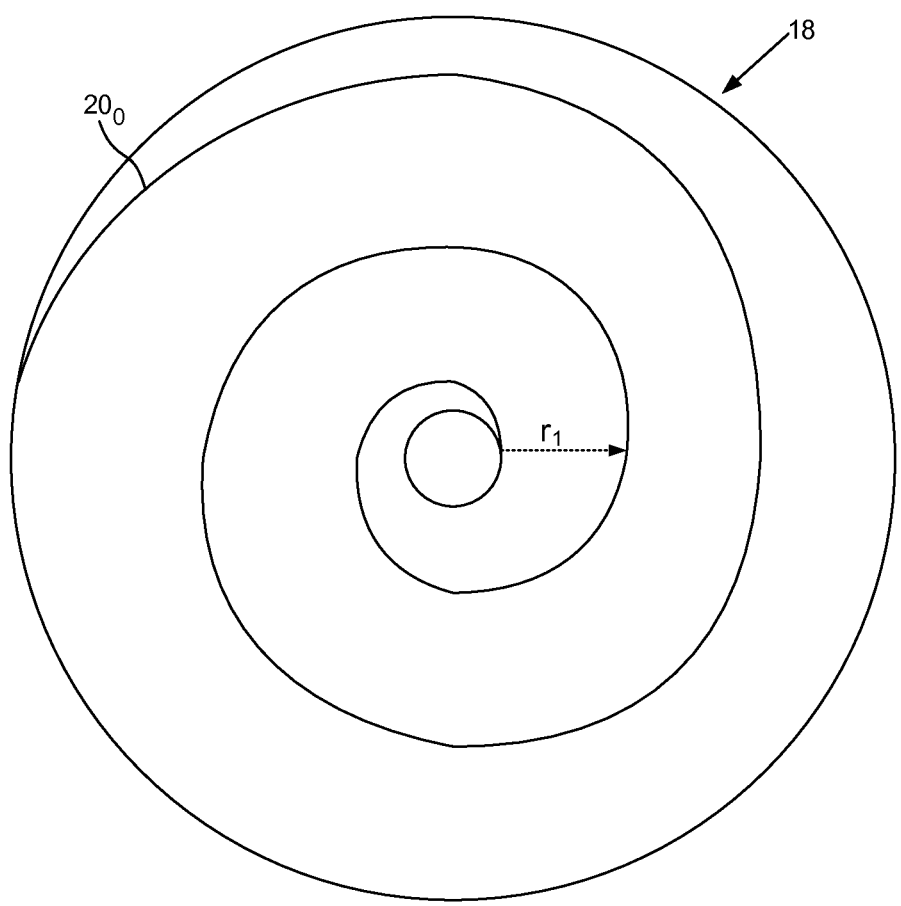
FIG. 3 shows an embodiment of the present invention wherein the reference pattern comprises a spiral track that spans multiple disk revolutions.

In one embodiment, the control circuitry 22 internal to the disk drive performs a self-servo write operation in order to write the servo sectors $38_0$-$38_N$ on the disk 18. During the self-servo write operation, the control circuitry 22 reads a reference pattern on the disk 18 in order to servo the head 16 while writing the servo sectors $38_0$-$38_N$. In the embodiment of FIG. 2A, the reference pattern comprises a plurality of spiral tracks $20_0$-$20_N$, wherein each spiral track comprises a high frequency signal periodically interrupted by a sync mark. When the head 16 moves in the radial direction, an eye pattern generated by reading a spiral track will shift (left or right) while the sync marks remain fixed (ideally). The shift in the eye pattern (detected from the high frequency signal) relative to the sync marks provides the off-track information (spiral position error signal (PES)) for servoing the head 16. Each spiral track may span a partial disk revolution as in the embodiment of FIG. 2A, or more than one disk revolution as illustrated in the embodiment of FIG. 3.

In on embodiment, the spiral track crossings are also used to synchronize a servo write clock used to write the servo sectors $38_0$-$38_N$ to the disk 18. The servo write clock is generated using a phase locked loop (PLL) where the phase error is measured based on when the sync marks are detected in each spiral track crossing. In an embodiment described below, the servo write clock is used to clock a modulo-N counter, and as each sync mark in a spiral track crossing is detected, the value of the modulo-N counter represents the phase error for adjusting the PLL.

Figure 4A:
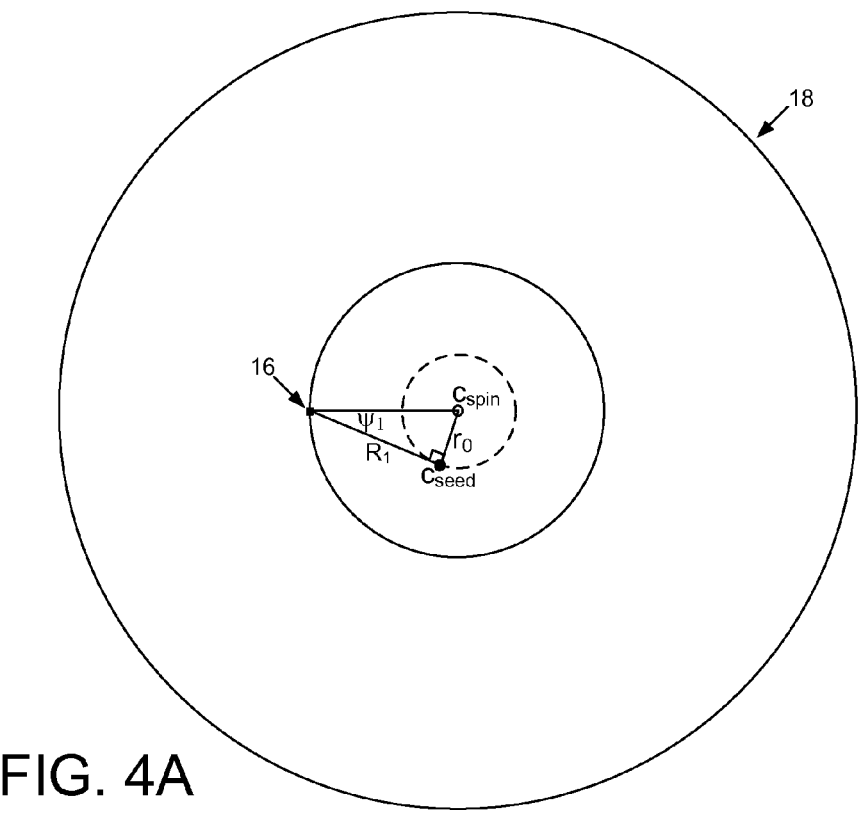
FIGS. 4A and 4B illustrate an embodiment of the present invention wherein repeatable runout (RRO) of a phase error at two radial locations is used to estimate the offset $r_0$.

The axis of rotation of the reference pattern recorded on the disk 18 may be offset from an axis of rotation of the disk 18. This is illustrated in FIG. 4A which shows an offset $r_0$ between Cspin (axis of disk) and Cseed (axis of reference pattern), wherein Cseed will rotate in a circle around Cspin (illustrated by a dashed line) as the disk 18 rotates. In one embodiment, the offset $r_0$ may be caused by an offset when clamping the disk 18 to a spindle motor after recording the reference pattern on the disk 18. In another embodiment, the control circuitry 22 may write the reference pattern on the disk 18, wherein the offset $r_0$ may be caused by errors in the writing process (written-in error).

As the disk 18 rotates and Cseed rotates around Cspin as shown in FIG. 4A, a repeatable runout (RRO) is induced in the phase error of the PLL that generates the servo write clock. The instantaneous RRO in the phase error relative to the rotation angle of the disk is represented by the angle $\Psi_1$ in FIG. 4A. In addition, the angle $\Psi_1$ representing the RRO in the phase error will reach a peak when the distance R1 of the head 16 from Cseed forms a right angle with the offset $r_0$. Although the location of the head 16 can be determined relative to the reference pattern, the distance R1 of the head 16 from Cseed is unknown (because $r_0$ is unknown).

Figure 4B:
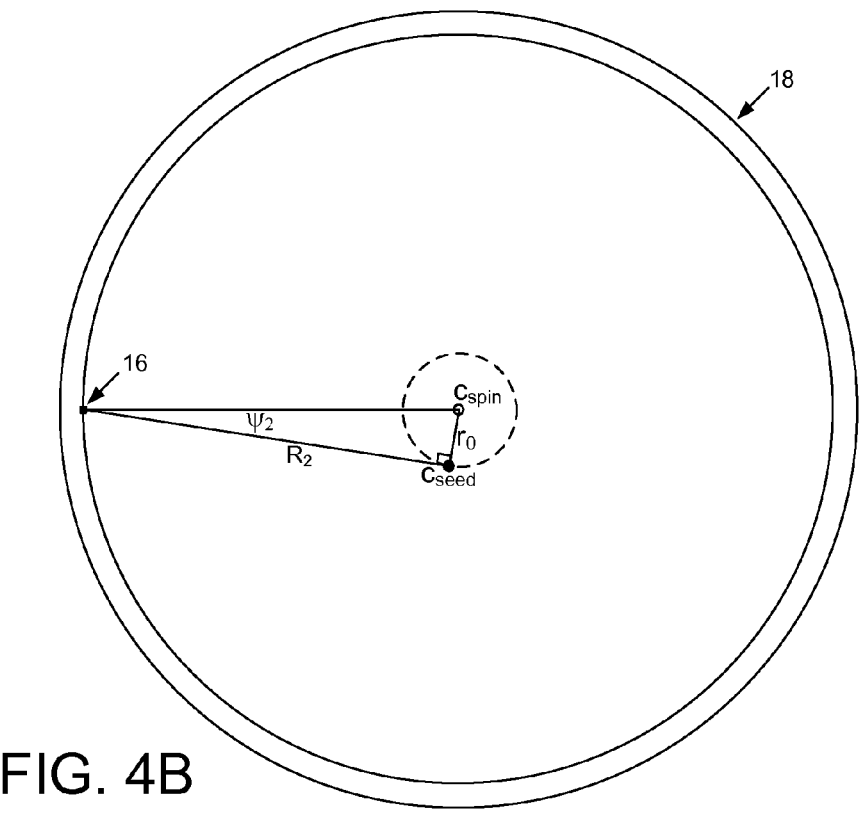

In one embodiment in order to estimate the offset $r_0$, the head 16 is positioned at a first radial location R1 as shown in FIG. 4A and a first peak $\Psi_1$ in a first RRO of the phase error is measured. The head 16 is then positioned at a second radial location R2 as shown in FIG. 4B and a second peak $\Psi_2$ in a second RRO of the phase error is measured. The offset $r_0$ may then be estimated in one embodiment as follows:

$$R2-R1=r_0/\tan\Psi_2-r_0/\tan\Psi_1$$

then $$r_0 = \frac{(R2 - R1)}{(1/\tan\psi_2 - 1/\tan\psi_1)} \quad \text{(FIG. 5)}$$

The phase of the offset $r_0$ relative to the rotation angle of the disk 18 may be determined relative to the angle of the disk 18 when the RRO in the phase error reaches its peak. In the example shown in FIGS. 4A and 4B, the rotation angle of the disk 18 is slightly different between the first peak $\Psi_1$ and the second peak $\Psi_2$. In one embodiment, the phase of the offset $r_0$ may be computed as the average of the rotation phase of the disk measured at the first peak $\Psi_1$ and the second peak $\Psi_2$.

Estimating the offset $r_0$ using the above equation assumes the head 16 follows the RRO in the position error while servoing on the reference pattern (e.g., using feed-forward compensation). In this manner, the distance between R1 and R2 can be measured based on the corresponding tracks defined by the reference pattern when $\Psi_1$ and $\Psi_2$ reach their peak. In another embodiment, the RRO may be canceled from the position error while servoing on the reference pattern. In this embodiment, R1 and R2 may be measured along the axis aligned with Cspin based on the corresponding tracks defined by the reference pattern when $\Psi_1$ and $\Psi_2$ reach their peak. Accordingly, the above equation in this embodiment is modified to derive the estimate for the offset $r_0$ based on the measured hypotenuse of the right triangles shown in FIGS. 4A and 4B.

FIG. 6A shows a timing control loop according to an embodiment of the present invention wherein an oscillator 48 generates the servo write clock 50 that clocks a modulo-N counter 52. The output 54 of the modulo-N counter represents a measured phase of the servo write clock 50 which is subtracted from a target phase 56 to generate a phase error 58. The phase error 58 is filtered with a suitable compensator 60 to generate a control signal 62. The phase error 58 comprises a RRO due to the offset $r_0$ between Cspin and Cseed as described above. In this embodiment, the RRO in the phase error 58 may be learned by adapting coefficients a1,b1 (block 64) of a sinusoid 66 that generates feed-forward timing compensation values 68. The sinusoid is generated according to:

$$a1\cos\left(\left(2\pi\cdot\left(\frac{k}{N}\right)\right)+\left(2\pi\cdot\frac{r}{r_1}\right)\right)+b1\sin\left(\left(2\pi\cdot\left(\frac{k}{N}\right)\right)+\left(2\pi\cdot\frac{r}{r_1}\right)\right)$$

where a1 and b1 are the first coefficients, k is the kth spiral track out of N spiral tracks, r is the radial location of the head, and $r_1$ represents a part of the radius of the disk spanned by a complete revolution of the spiral tracks (as illustrated in FIG. 3).

The feed-forward timing compensation values 68 adjust the control signal 62 to generate an adjusted control signal 70 used to adjust the frequency of the oscillator 48. The coefficients a1,b1 are adapted 64 in order to drive the RRO in the phase error 58 toward zero. Once the coefficients a1,b1 have adapted, the resulting sinusoid 66 represents the RRO in the phase error 58, and the peak in the sinusoid 66 represents the peak in the RRO ($\Psi_1$ or $\Psi_2$ described above).

FIG. 6B shows an alternative embodiment of the present invention wherein coefficients a1,b1 of a sinusoid 72 may be adapted 74 in response to the phase error 58 to generate timing compensation values 76 that are subtracted from the phase error 58 in order to generate an adjusted phase error 78. The coefficients a1,b1 are adapted until the RRO is substantially canceled from the adjusted phase error 78, thereby generating a servo write clock 50 that is synchronized to the rotation of the disk 18 rather than to the rotation of the reference pattern as in the embodiment of FIG. 6A. Similar to the embodiment of FIG. 6A, after the coefficients a1,b1 have adapted, the resulting sinusoid 72 represents the RRO in the phase error 58, and the peak in the sinusoid 72 represents the peak in the RRO ($\Psi_1$ or $\Psi_2$ described above).

The estimated offset $r_0$ (amplitude and/or phase) may be used in any suitable manner. For example, the estimated offset $r_0$ may be used to generate compensation values for a position control loop and/or a timing control loop when writing the product servo sectors 38$_0$-38$_N$ to the disk while servoing the head 16 off of the reference pattern (e.g., the spiral tracks 20$_0$-20$_N$ shown in FIG. 2A). The compensation values may be used to follow an RRO in a position error or phase error, or the compensation values may be used to cancel the RRO.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a reference pattern;
a head actuated over the disk; and
control circuitry operable to:
  position the head at a first radial location;
  measure a first phase error in response to the reference pattern at the first radial location;
  measure a first repeatable runout (RRO) of the first phase error;
  position the head at a second radial location;
  measure a second phase error in response to the reference pattern at the second radial location;
  measure a second repeatable runout (RRO) of the second phase error; and
  process the first and second RROs to estimate an offset $r_0$ representing a difference between an axial rotation of the disk and an axial rotation of the reference pattern.

2. The disk drive as recited in claim 1, wherein the reference pattern comprises a plurality of spiral tracks.

3. The disk drive as recited in claim 1, wherein the control circuitry is operable to:
generate timing compensation values;
generate a control signal in response to the first phase error and the timing compensation values; and
adjust a frequency of an oscillator in response to the control signal.

4. The disk drive as recited in claim 3, wherein the control circuitry is operable to:
generate the timing compensation values as feed-forward timing compensation values;
adjust the control signal using the feed-forward timing compensation values to generate an adjusted control signal; and
adjust the frequency of the oscillator in response to the adjusted control signal.

5. The disk drive as recited in claim 3, wherein the control circuitry is operable to adapt coefficients of a sinusoid in response to the first phase error to generate the timing compensation values.

6. The disk drive as recited in claim 5, wherein the control circuitry is operable to measure a first peak $\Psi_1$ in the first RRO based on the coefficients.

7. The disk drive as recited in claim 1, wherein the control circuitry is operable to:
measure a first peak $\Psi_1$ in the first RRO;
measure a second peak $\Psi_2$ in the second RRO; and
estimate the offset $r_0$ in response to the first peak $\Psi_1$ and the second peak $\Psi_2$.

8. The disk drive as recited in claim 7, wherein the control circuitry is further operable to estimate the offset $r_0$ according to:

$$\frac{(R2 - R1)}{(1/\tan\psi_2 - 1/\tan\psi_1)}$$

where:
$R_1$ is the first radial location; and
$R_2$ is the second radial location.

9. A method of operating a disk drive, the disk drive comprising a disk comprising a reference pattern, a head actuated over the disk, the method comprising:
positioning the head at a first radial location;
measuring a first phase error in response to the reference pattern at the first radial location;
measuring a first repeatable runout (RRO) of the first phase error;
positioning the head at a second radial location;
measuring a second phase error in response to the reference pattern at the second radial location;
measuring a second repeatable runout (RRO) of the second phase error; and
processing the first and second RROs to estimate an offset $r_0$ representing a difference between an axial rotation of the disk and an axial rotation of the reference pattern.

10. The method as recited in claim 9, wherein the reference pattern comprises a plurality of spiral tracks.

11. The method as recited in claim 9, further comprising:
generating timing compensation values;
generating a control signal in response to the first phase error and the timing compensation values; and
adjusting a frequency of an oscillator in response to the control signal.

12. The method as recited in claim 11, further comprising:
generating the timing compensation values as feed-forward timing compensation values;
adjusting the control signal using the feed-forward timing compensation values to generate an adjusted control signal; and
adjusting the frequency of the oscillator in response to the adjusted control signal.

13. The method as recited in claim 11, further comprising adapting coefficients of a sinusoid in response to the first phase error to generate the timing compensation values.

14. The method as recited in claim 13, further comprising measuring a first peak $\Psi_1$ in the first RRO based on the coefficients.

15. The method as recited in claim 9, further comprising:
measuring a first peak $\Psi_1$ in the first RRO;
measuring a second peak $\Psi_2$ in the second RRO; and
estimating the offset $r_0$ in response to the first peak $\Psi_1$ and the second peak $\Psi_2$.

16. The method as recited in claim 15, further comprising estimating the offset $r_0$ according to:

$$\frac{(R2 - R1)}{(1/\tan\psi_2 - 1/\tan\psi_1)}$$

where:
$R_1$ is the first radial location; and
$R_2$ is the second radial location.

* * * * *